United States Patent [19]
Oh et al.

[11] Patent Number: 5,683,220
[45] Date of Patent: Nov. 4, 1997

[54] TRUCK FOR USE IN AN AUTO TRAY CHANGER

[75] Inventors: Doo-Hwan Oh; Jong-Kun Jung, both of Seoul, Rep. of Korea

[73] Assignee: Daewoo Electronics Co., Ltd., Seoul, Rep. of Korea

[21] Appl. No.: 645,943

[22] Filed: May 14, 1996

[30] Foreign Application Priority Data

May 18, 1995 [KR] Rep. of Korea ............. 95-12337

[51] Int. Cl.⁶ .................................................. B60P 1/52
[52] U.S. Cl. ...................... 414/529; 414/401; 414/536
[58] Field of Search ..................... 41/343, 344, 400, 41/401, 529, 923, 536; 200/47.34

[56] References Cited

U.S. PATENT DOCUMENTS

| | | | |
|---|---|---|---|
| 2,813,642 | 11/1957 | Fisher | 414/536 |
| 3,429,403 | 2/1969 | Drechsler et al. | 414/536 |
| 4,120,411 | 10/1978 | Johnson | 414/401 |
| 4,923,202 | 5/1990 | Breveglieri et al. | 280/47.35 |
| 5,072,960 | 12/1991 | Sperko | 414/401 |
| 5,320,475 | 6/1994 | Pinder | 414/529 |

FOREIGN PATENT DOCUMENTS

| | | | |
|---|---|---|---|
| 276231 | 2/1969 | Austria | 414/401 |
| 291821 | 2/1971 | U.S.S.R. | 414/536 |
| 156962 | 1/1921 | United Kingdom | 414/401 |

*Primary Examiner*—Thomas J. Brahan
*Attorney, Agent, or Firm*—Anderson Kill & Olick P.C.

[57] ABSTRACT

A truck for use in an auto tray changer capable of supplying and discharging a plurality of trays into and from the auto tray changer all at once, respectively, includes a loading portion having a bottom plate, in which the trays for loading working pieces or worked pieces are stacked, each corner of the bottom plate being provided with a wheel, respectively, which is capable of freely rotating, a pair of rail portions for transporting the trays stacked thereon back and forth on the bottom plate, a pair of stopper means mounted at front of each of the rail potions for selectively transporting the tray stacked at the bottom of the stack on the bottom plate, and a handle portion mounted at back of the loading portion.

4 Claims, 5 Drawing Sheets

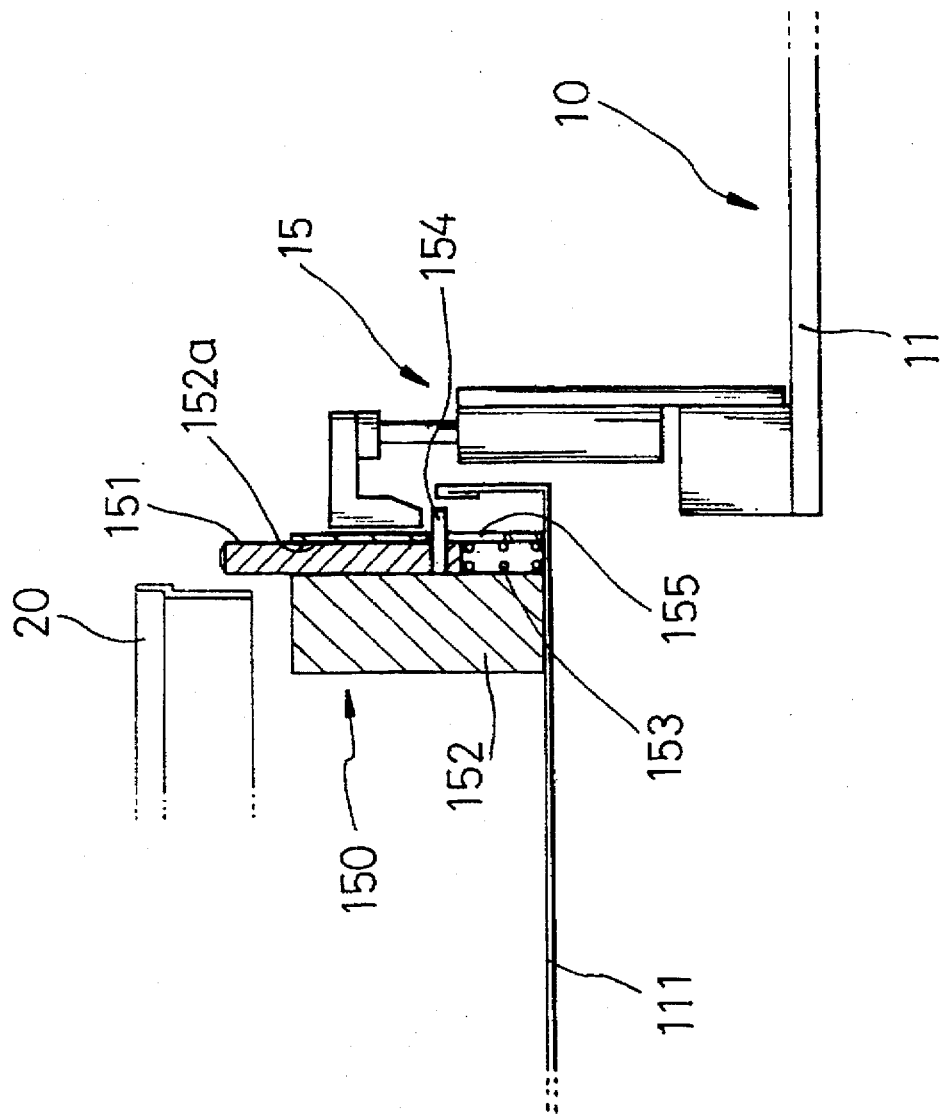

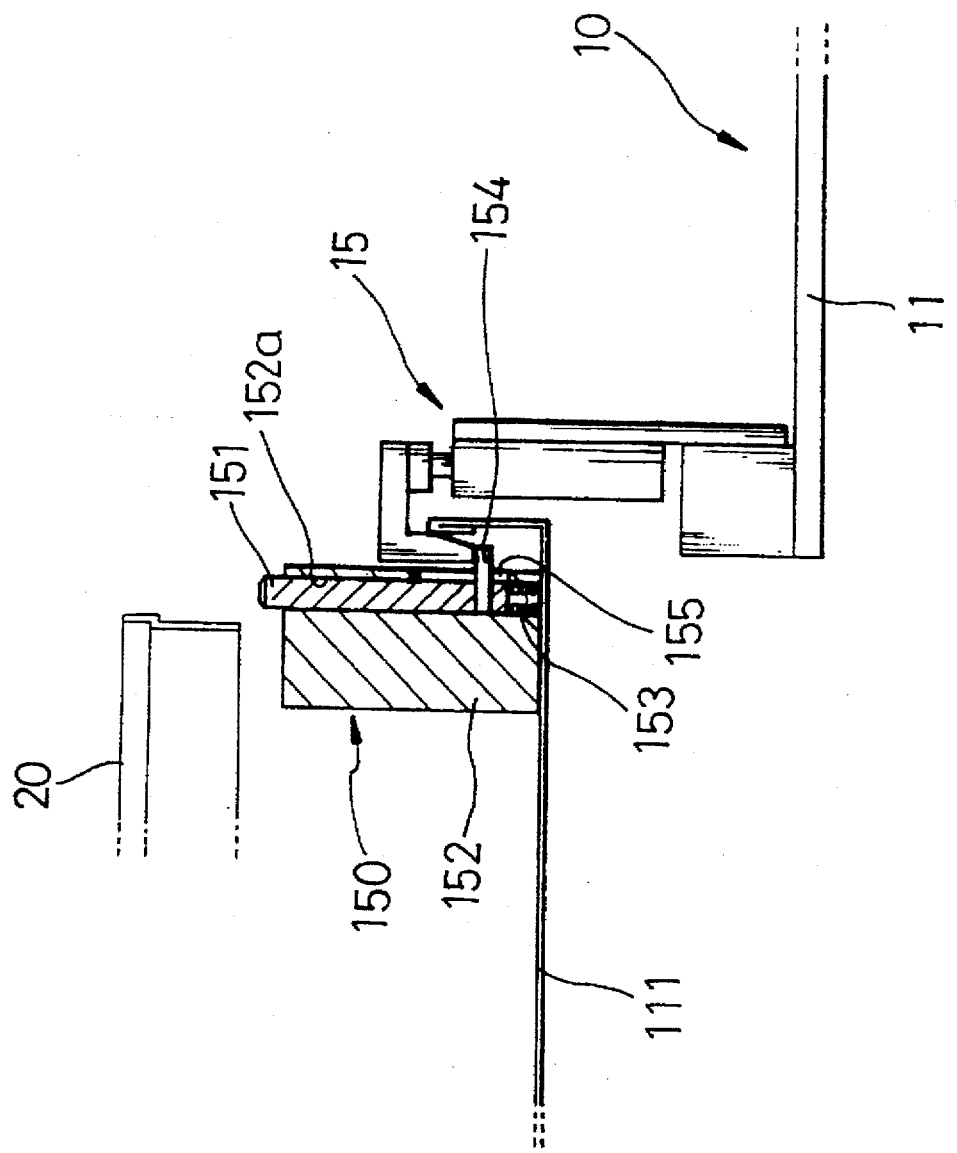

TRUCK FOR USE IN AN AUTO TRAY CHANGER

BACKGROUND OF THE INVENTION

1. Field of the Invention

The present invention relates to a truck for use in an auto tray changer; and, more particularly, to a truck capable of supplying and receiving a plurality of trays loaded with working pieces and worked pieces into and from the auto tray changer all at once, respectively.

2. Description of the Prior Art

As is well known, upper and lower drums for use in a video cassette recorder are produced by first die casted into respective working pieces, which are then put through a variety of mechanical forming steps such as a rough-cutting, a hole forming, a finishing, a washing, a tape buffing and a hard carbon film coating, until the desired products, i.e., worked pieces, are obtained.

Usually, in the production of the drums, one numeric control machine sequentially performs all of the necessary mechanical forming steps, and a production line therefor is set up in such a way that the working pieces are continuously supplied into the numeric control machine. The continuous supply of the working pieces is achieved through an auto tray changer which injects a tray loaded with working pieces into the numeric control machine, thereby continuously supplying the working pieces thereonto, loads the worked pieces into the tray, and discharges the tray. The auto tray changer is conventionally provided with a conveyer system or a chain type buffer for performing the injection and the discharge of the tray.

However, in the conveyer system or the chain type buffer, the initial injection and the discharge of the trays are performed manually, which may inadvertently damage the working pieces or the worked pieces, entail fatigue on the worker and decrease the production efficiency.

Moreover, the conventional conveyer system or the chain type buffer occupies an excessive equipment space and further requires a separate truck for transporting the trays thereinto. In other words, it is difficult to achieve a systematic working and manufacturing management with the auto tray changer provided with the conveyer system or the chain type buffer.

In order to overcome the above described shortcomings, an unmanned transporting truck may be employed and collectively controlled by a direct numerical control. However, the direct numerical control requires an excessive initial equipment investment. In addition, malfunctioning of any one of the numeric control machines may result in malfunctioning of the whole production line, entailing a decrease in the production efficiency thereof.

In order to alleviate the above shortcomings, the present inventors proposed an auto tray changer which does not employ the conventional conveyer system or the chain type buffer as shown in FIG. 1, which is disclosed in a greater detail in a co-pending, commonly owned application, U.S. Ser. No. 08/651,027, dated May 20, 1996, entitled "AUTO TRAY CHANGER", which is incorporated herein by reference. As shown, the auto tray changer 10 includes a transporting means for transporting a plurality of trays stacked on top of each other and to be loaded into a transporting chamber 11, each of the trays being loaded with working pieces or worked pieces; a first lifting means for lifting up the tray loaded in the transporting chamber 11 to a working chamber 13; means for clamping the tray located at top of the stack; a robot 14 for supplying the working pieces in order into a numeric control machine or for loading the worked pieces in order into the tray from the numeric control machine; means for transporting the tray loaded with the worked pieces into an upper portion of the discharging chamber 12; a second lifting means for lifting down the tray into a lower portion of the discharging chamber 12; and means for discharging the tray from the discharging chamber 12.

In such an auto tray changer 10, it is important that the trays 20 are injected into the injecting chamber 11 and are discharged from the discharging chamber 12 all at once, respectively.

SUMMARY OF THE INVENTION

It is, therefore, a primary object of the invention to provide a truck for use in an auto tray changer, which is capable of supplying and receiving a plurality of trays loaded with working pieces and worked pieces into and from the auto tray changer all at once, respectively.

The above and other objects of the present invention are accomplished by providing a truck for use in an auto tray changer, the truck comprising:

a loading portion having a bottom plate, in which a plurality of trays for loading working pieces or worked pieces are stacked on top of each other, each corner of a lower portion of the bottom plate being provided with a wheel, respectively, which is capable of freely rotating;

a pair of rail portions for transporting the trays stacked thereon back and forth on the bottom plate;

a pair of stopper means mounted at front of each of the rail portions for selectively interrupting the tray located at the bottom of the stack on the bottom plate; and a handle portion mounted at back of the loading portion for transporting the truck.

BRIEF DESCRIPTION OF THE DRAWINGS

The above and other objects, features and advantages of the present invention will become apparent from the following detailed description of preferred embodiments taken in conjunction with the accompanying drawings, in which:

FIGS. 4A and 4B describe cross sectional views showing an operating condition of a stopper means of the truck in accordance with the present invention.

DETAILED DESCRIPTION OF THE PREFERRED EMBODIMENTS

Figure 2:
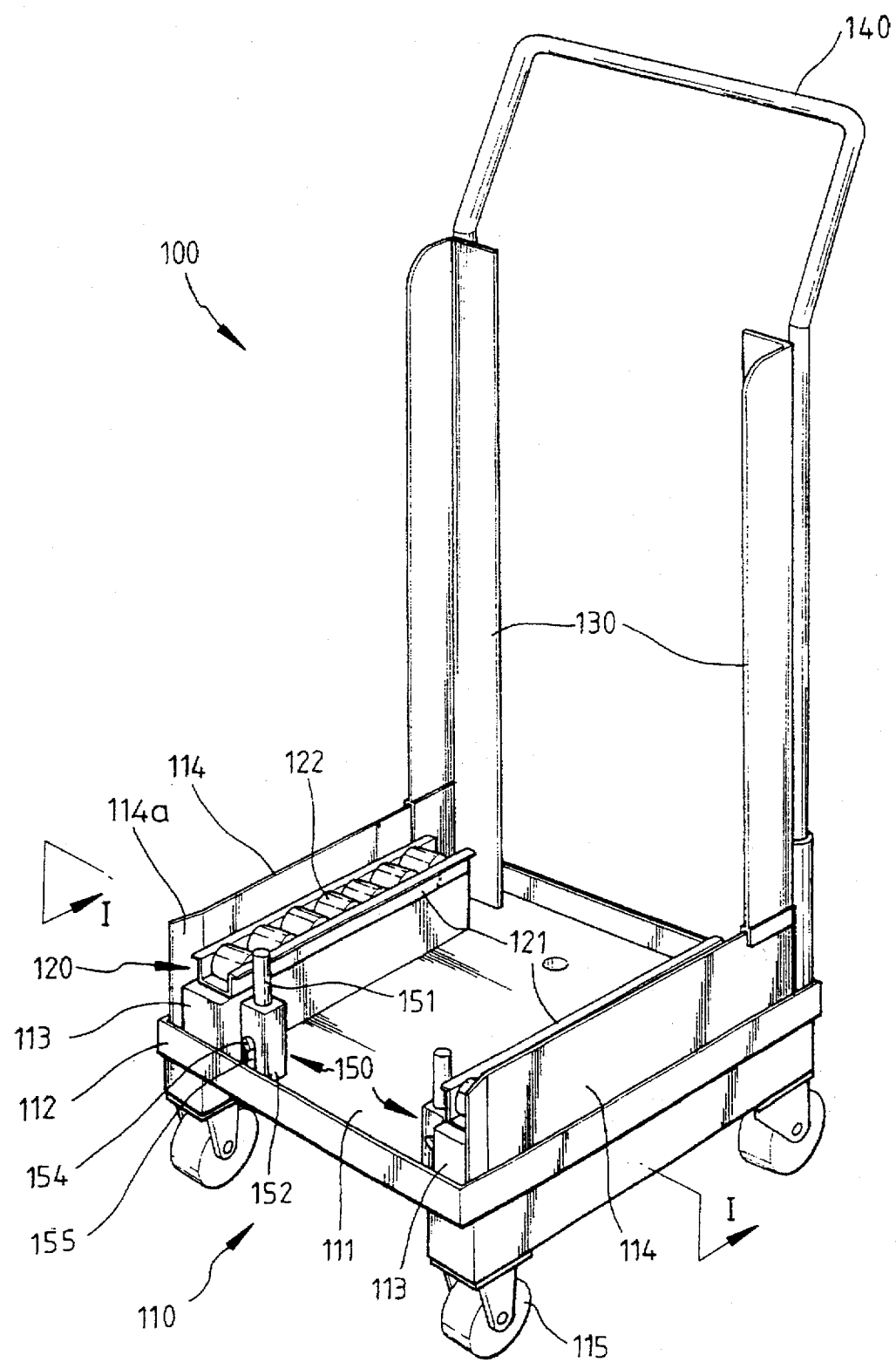
FIG. 2 depicts a truck for use in the auto tray changer of FIG. 1 in accordance with the present invention.
Figure 3:
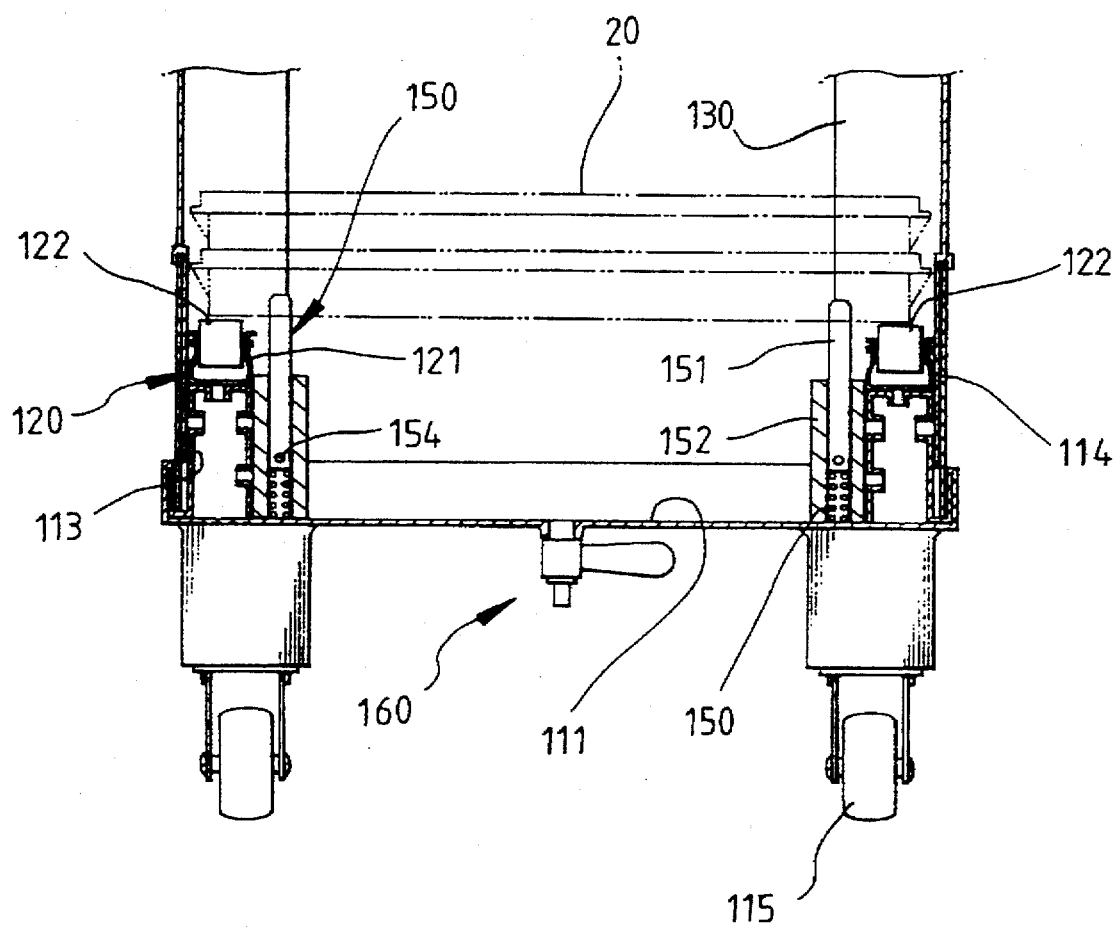
FIG. 3 presents a sectional view taken A—A line of FIG. 2.

Referring now to FIGS. 2 and 3, there are shown a truck 100 for use in an auto tray changer in accordance with a preferred embodiment of the present invention. As shown, the truck 100 includes a loading portion 110 having a bottom plate 111, in which a plurality of trays 20 for loading working pieces or worked pieces are stacked, a pair of rail portions 120 for transporting the trays 20 stacked thereon back and forth on the bottom plate 111, a pair of stopper means 150 mounted at front of each of the rail portions 120 for selectively interrupting the tray 20 located at the bottom of the stack, and a handle portion 140 mounted at rear of the loading portion 110 for transporting the truck 100. Each corner of a lower portion of the bottom plate 111 is provided with a wheel 115, respectively, which can be freely rotated.

On the other hand, the loading portion 110 includes a front, a back and a pair of side wall portions 112 vertically mounted along the periphery of the bottom plate 111, a pair of side frames 113, each of the side frames being juxtaposed adjacent to an inner side of each of side wall portions 112, a pair of guide panels 114 for guiding both sides of the tray 20 located at the bottom of the stack, each of the guide panels being provided between the inner side of the side wall portion 112 and the side frame 113, respectively, and a pair of support panels 130 mounted on back of the guide panels 114 and extended upward therefrom.

Further, each tip end of the guide panels 114 has a guide face 114a outwardly bent to thereby guide the trays 20 easily. Preferably, the support panel 130 may have an "L" shape to thereby prevent each of the trays 20 on the stack from deviating from its intended position or the loading portion 110 while moving the truck 100. Further, it is preferable that the bottom plate 111 may include a drain cork 160 at rear thereof so as to allow water used in washing the trays 20 loaded with the worked pieces to be discharged easily.

Each of the rail portions 120 includes a bracket 121 fixed on an upper surface of each of the side frames 113, and a plurality of rollers 122 rotatably mounted at each predetermined position in the bracket 121. The rollers 122 are partially exposed from the upper portion of the bracket 121.

As best shown in FIGS. 2, 3, 4A and 4B, each of the stopper means 150 includes a body 152 having a guide hole 152a partially extending from a top surface to a bottom surface thereof and a guide slit 155 having a predetermined length on a front surface thereof, the guide hole 152a being communicated with the guide slit 155. Further, the stopper means 150 includes a stopper 151 inserted into the guide hole 152a (FIG. 4) allowing the stopper 151 to slide upward and downward, an operating pin 154 connected to a lower end of the stopper 151 and horizontally projected at a predetermined distance from the guide slit 155, and a spring 153 provided between the lower end of the stopper 151 and bottom of the guide hole 152a to elastically support an upward movement of the stopper 151. When the stopper 151 is in upward position, it is preferable to be projected above the bottom of the tray 20 located at the bottom of the stack, thereby preventing the trays from separating from the loading portion 110 during the transporting of the truck 100.

Figure 1:
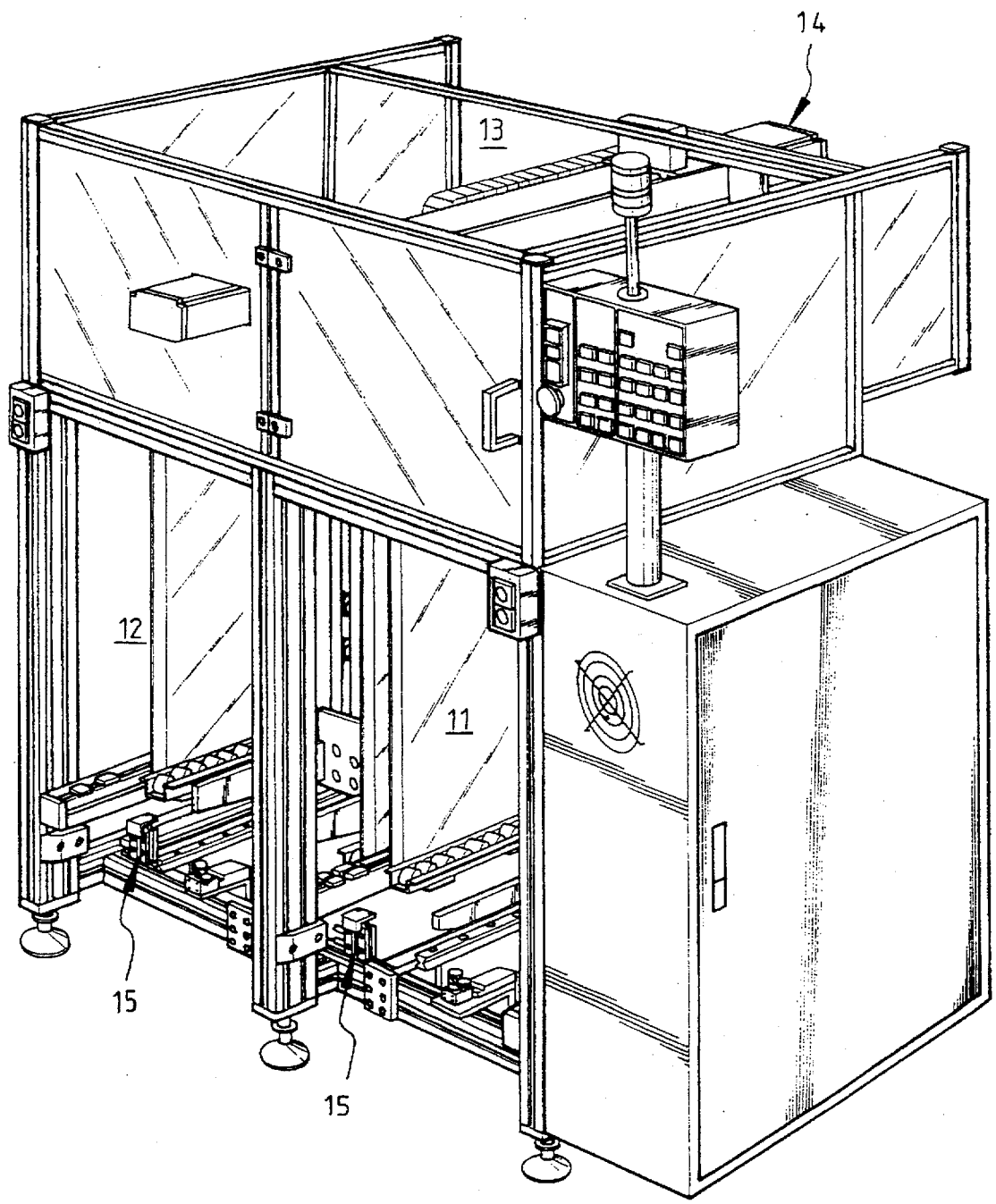
FIG. 1 shows a perspective view of an auto tray changer.

The operation of the truck 100 in accordance with the present invention is as follows:

The plurality of trays 20 for loading the working pieces are stacked on the loading portion 110 of the truck 100. At this time, as both sides of the tray 20 located at the bottom of the stack are supported by each of the guide panels 114, each of which is formed between the inner side of the side wall portion 112 and the side frame 113, the tray 20 located at the bottom of the stack is allowed to be freely transported along the rail portion 120. When a predetermined number of trays 20 are stacked on the truck 100, an operator grips the handle portion 140 of the truck 100 and transports the truck 100 into an injection chamber 11 of the auto tray changer 10 as shown in FIG. 1. In transporting, each of the trays 20 in the stack is kept in position by the stopper means 150, the "L" shaped support panel 130 and the guide panels 114, the stopper means 150 and the L-shaped support panel 130 preventing each of the trays from moving back and forth, and the guide panels, from side to side. Accordingly, the trays 20 may be easily transported by the truck in accordance with the present invention.

In injecting the stacked trays 20 into the injection chamber 11 of the auto tray changer 10, the wheels 115 of the truck 100 are kept located by a locking means(not shown) of the auto tray changer. At the same time, the operating pin 154 is shifted downward by a locker 15 which is installed at the front portion of the injection chamber 11 as shown in FIG. 4B, thereby transporting the plurality of trays 20, stacked on the loading portion 110 into the injection chamber 11 through an injecting means(not shown) of the auto tray changer 10.

On the other hand, in discharging the stacked trays 20 loaded with the worked pieces from the discharging chamber 12 of the auto tray changer 10, the locking means(not shown) of the auto tray changer 10 is released and the locker 15 is lifted up to thereby remove the force compressing the operating pin 154 as shown in FIG. 4A. As a result, the stopper 151 inserted into the body 152 is projected upward by the restoring force of the spring 153, thereby holding the front portion of the tray 20 located at the bottom of the stack and preventing the trays 20 from separating during the transporting the truck 100.

Although the invention has been shown and described with respect to the preferred embodiments, it will be understood by those skilled in the art that certain changes and modifications may be made without departing from the spirit and scope of the invention as defined in the following claims.

What is claimed is:

1. A truck for transporting a plurality of trays for use in an auto tray changer, in which the trays for loading working pieces or worked pieces are stacked on top of each other, the truck comprising:

a loading portion having a bottom plate, each corner of a lower portion of the bottom plate being provided with a wheel, respectively, which is capable of freely rotating, a front, a back and a pair Of side wall portions vertically mounted along a periphery of the bottom plate, a pair of side frames, each of the side frames being juxtaposed adjacent to an inner side of each of the side wall portions, a pair of guide panels for guiding both sides of the tray located at the bottom of the stack, each of the guide panels being provided between the inner side of the side wall portions and the side frame, and a pair of support panels mounted at rear of the guide panels and extended upward therefrom;

a pair of rail portions for transporting the trays stacked thereon back and forth on the bottom plate;

a pair of stopper means mounted at front of each of the rail portions for selectively interrupting the transporting of a tray located at the bottom of the stack on the rail portions; and a handle portion mounted at back of the loading portion for transporting the truck.

2. The truck of claim 1, wherein the respective support panels have an "L" shape to prevent the stacked trays from separating from the loading portion during a transporting of the truck.

3. The truck of claim 1, wherein the respective rail portions include a bracket fixed on an upper surface of the side frames, and a plurality of rollers rotatably mounted at a predetermined space in the bracket.

4. The truck of claim 1, wherein each of the stopper means includes a body having a guide hole partially extending from a top surface toward a bottom surface thereof, a guide slit having a predetermined length on a front surface thereof, the guide hole being communicated to the guide slit, a stopper inserted into the guide hole to thereby allow the stopper to slide upward and downward, an operating pin connected to a lower end of the stopper and horizontally projected at a predetermined distance from the guide slit, and a spring provided between the lower end of the stopper and bottom of the guide hole to elastically support an upward movement of the stopper.

* * * * *